F. C. AREY.
CHANNEL LATH RIVETING MACHINE.
APPLICATION FILED MAY 3, 1915.
1,201,539.
Patented Oct. 17, 1916.
6 SHEETS—SHEET 1.
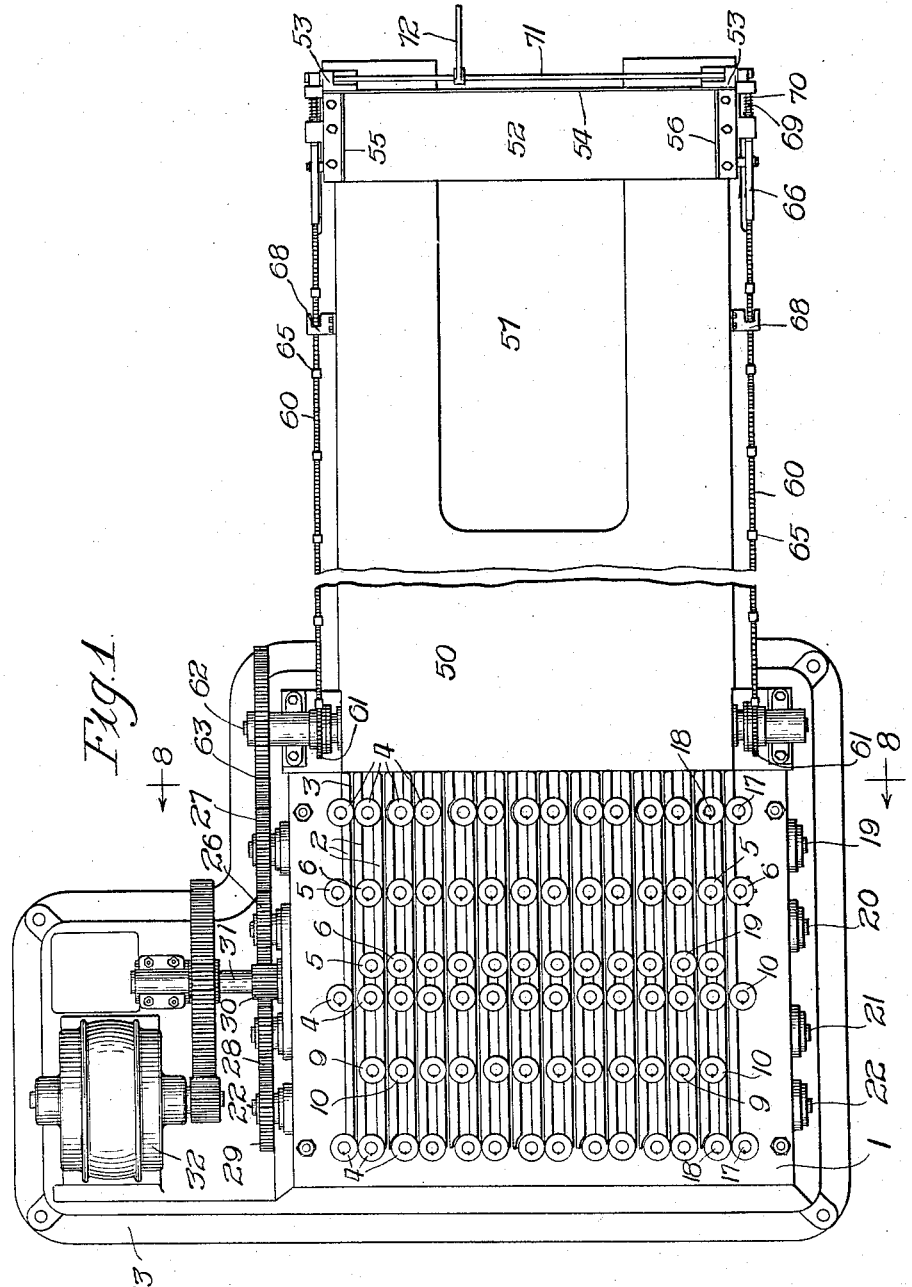
Witness:
H. S. Gauthier
Inventor
Fred C. Arey
by Chamberlin Hendenreich
Attys

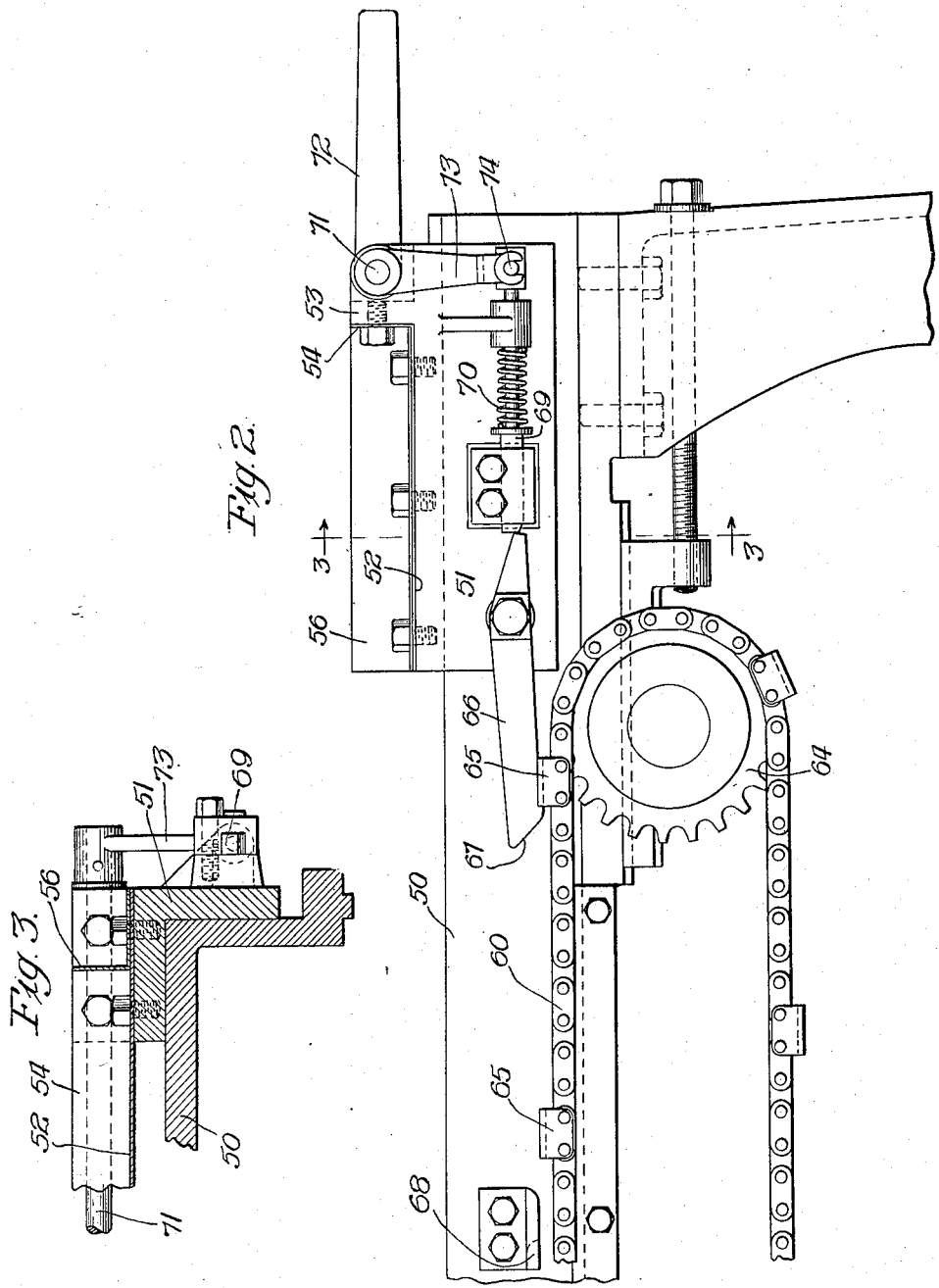

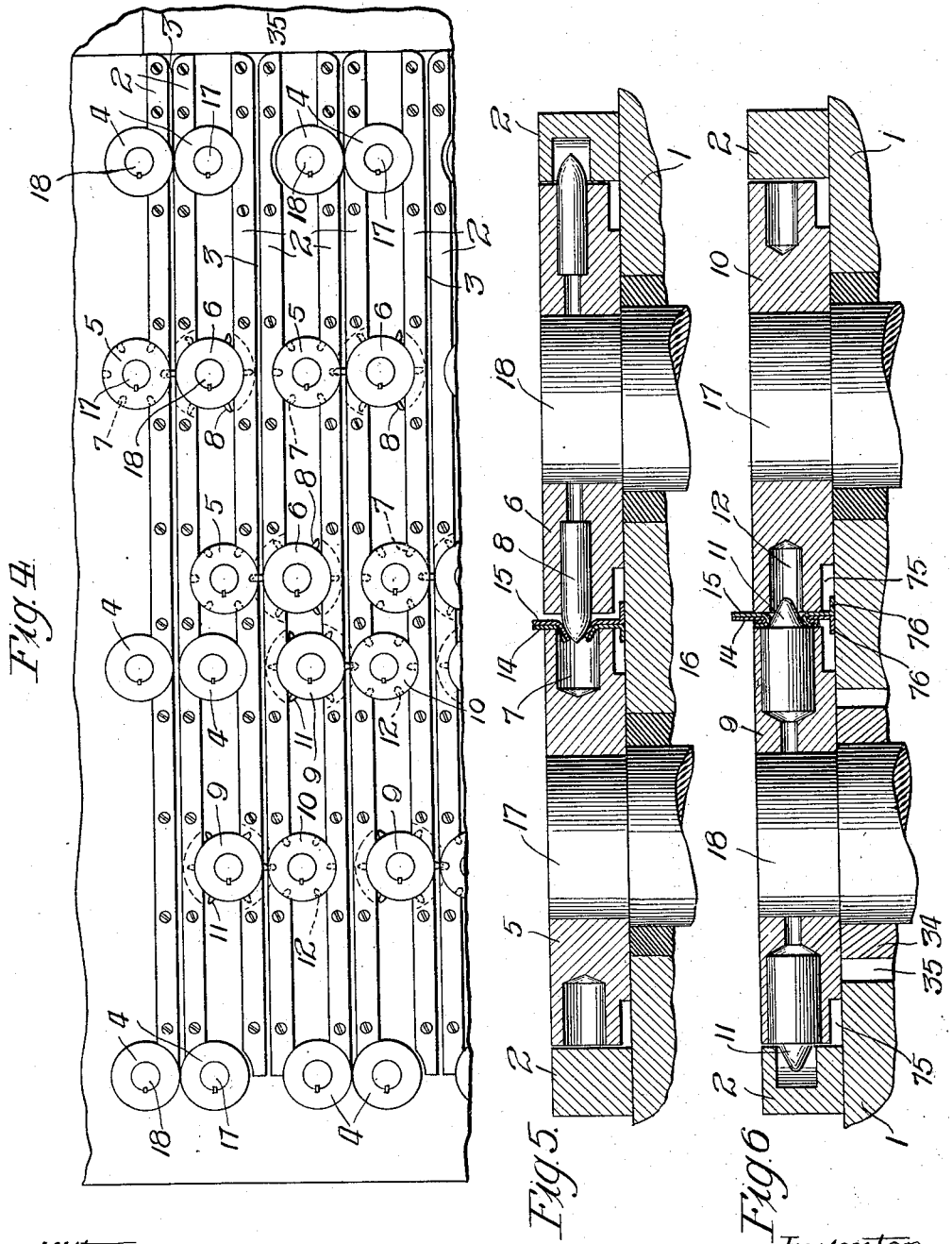

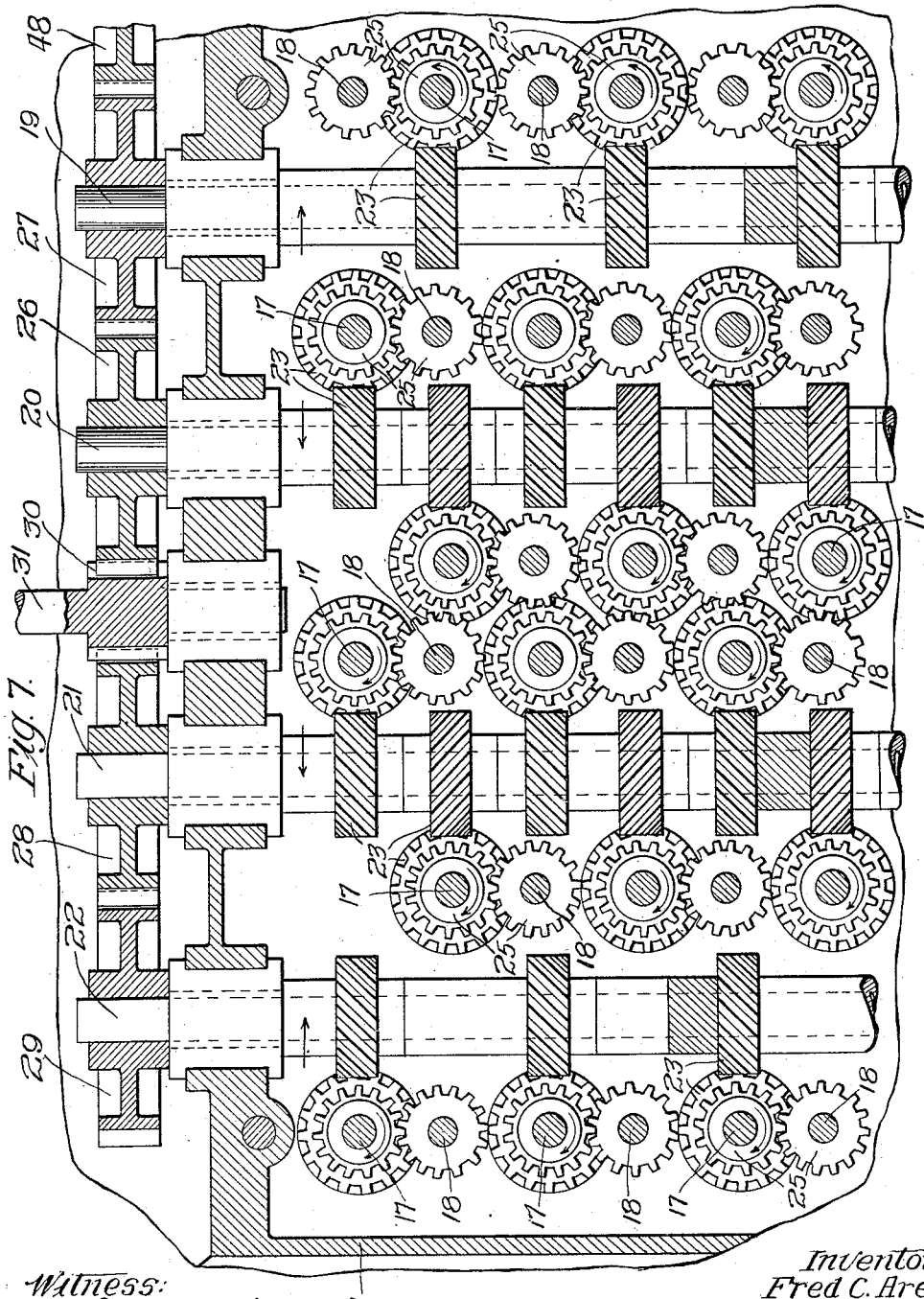

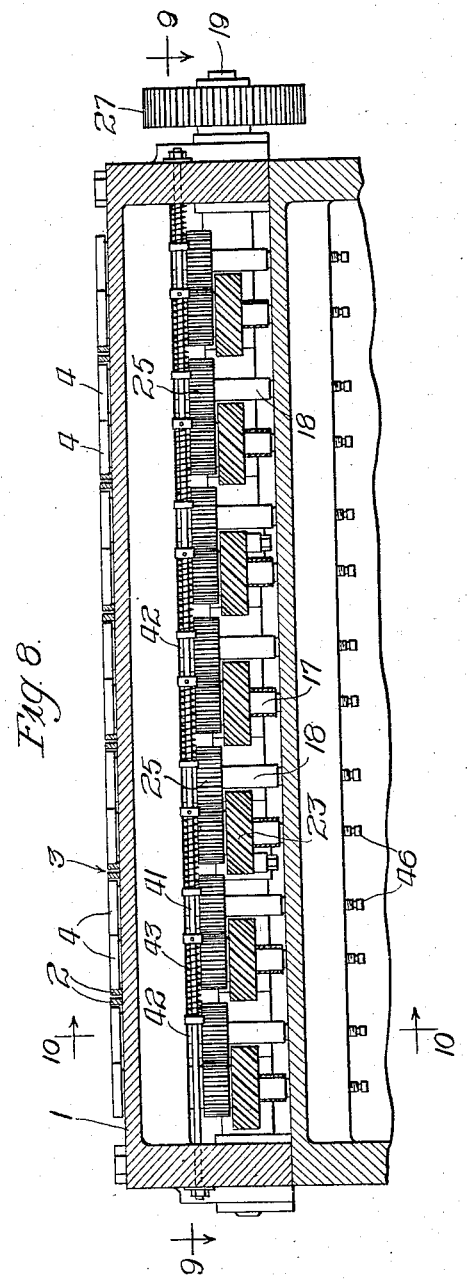
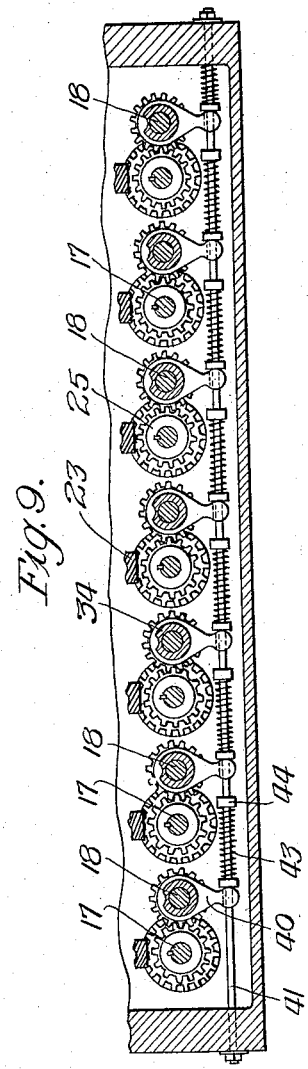

F. C. AREY.
CHANNEL LATH RIVETING MACHINE.
APPLICATION FILED MAY 3, 1915.
1,201,539.
Patented Oct. 17, 1916.
6 SHEETS—SHEET 6.
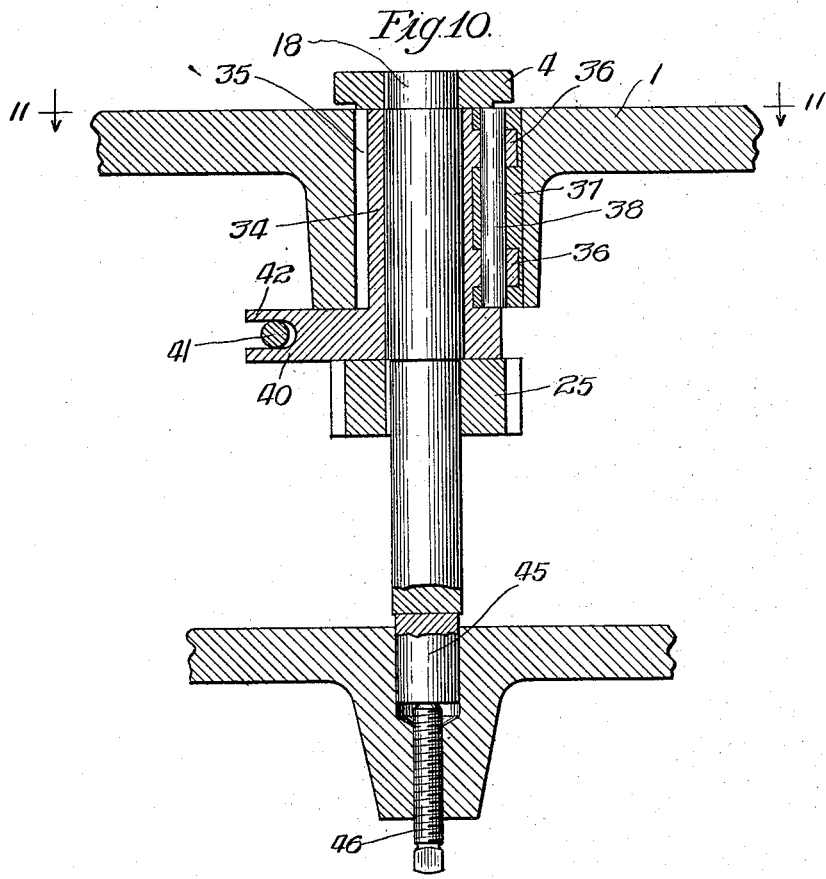
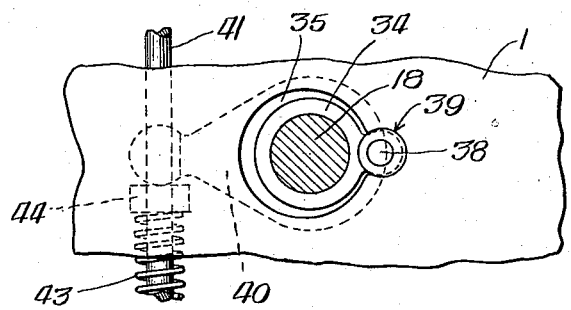
Witness:
H. S. Gaither
Inventor
Fred C. Arey
by Chamberlin Friedenreich
Attys.

UNITED STATES PATENT OFFICE.

FRED C. AREY, OF OAK PARK, ILLINOIS, ASSIGNOR TO NORTHWESTERN EXPANDED METAL COMPANY, OF CHICAGO, ILLINOIS, A CORPORATION OF ILLINOIS.

CHANNEL-LATH-RIVETING MACHINE.

1,201,539.    Specification of Letters Patent.    Patented Oct. 17, 1916.

Application filed May 3, 1915. Serial No. 25,376.

*To all whom it may concern:*

Be it known that I, FRED C. AREY, a citizen of the United States, residing at Oak Park, county of Cook, State of Illinois, have invented a certain new and useful Improvement in Channel-Lath-Riveting Machines, and declare the following to be a full, clear, and exact description of the same, such as will enable others skilled in the art to which it pertains to make and use the same, reference being had to the accompanying drawings, which form a part of this specification.

My invention, specifically considered, has for its object to produce a simple and reliable machine for riveting together any desired number of channel laths, within limits, so as to form a single stiff sheet smooth on one face and ribbed on the other.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a top plan view of a machine arranged in accordance with my invention, a portion of the feed table being broken away; Fig. 2 is a side view on an enlarged scale of the front end of the feed table and its apron; Fig. 3 is a section on line 3—3 of Fig. 2; Fig. 4 is a top plan view on an enlarged scale of a fragment of the puncturing and riveting mechanism; Fig. 5 is a section on an enlarged scale taken in a plane passing through the axis of two coöperating puncturing heads; Fig. 6 is a section on an enlarged scale taken on a plane passing through the axes of two coöperating riveting heads; Fig. 7 is a section on the same scale as Fig. 4 taken in a horizontal plane below the top wall of the hollow bed on which the puncturing and riveting heads lie; Fig. 8 is a section taken approximately on line 8—8 of Fig. 1, on a somewhat larger scale than Fig. 1; Fig. 9 is a section taken approximately on line 9—9 of Fig. 8, showing only the shafts on which front feeding heads are mounted; Fig. 10 is a section on an enlarged scale on line 10—10 of Fig. 8; and Fig. 11 is a section on line 11—11 of Fig. 10.

Referring to the drawing, 1 represents a hollow bed in the form of a long broad rectangular metal box having a flat top or work-receiving surface, the width of the bed being as great as the width of the sheet which it is desired to produce. In accordance with my invention I arrange upon the bed a plurality of groups of metal puncturing and riveting mechanisms so located that when a plurality of channel-shaped strips are laid side by side and slid upon the bed, adjacent flanges will be riveted together by means of rivets formed out of the metal of the strips; the parts being of course arranged so as to act on strips having a definite width. On top of the bed I arrange a series of pairs of guides, 2, extending parallel with each other in the direction of the length of the table; the guides of each pair being spaced apart so as to provide between them a channel or way, 3, for receiving the two engaging flanges of two consecutive laths, and the pairs of guides being spaced apart from each other so as to make the distance between the channels or ways equal to the width of the laths. Consequently, when a number of laths are laid side by side with the flanges on the under side, and the outermost flange is directed into one of the channels, all of the other flanges or pairs of flanges will find corresponding channels or ways into which to enter. By this means the laths to be riveted together are properly alined and kept in alinement while passing over the bed of the machine.

Arranged adjacent to each of the channels are devices for puncturing the flanges of the laths, the displaced metal being pushed laterally. Additional means are provided in connection with all of the channels, except the two outer ones, whereby the metal displaced in puncturing the flanges of the laths will be clenched so as to make a rivet. If desired, means may also be provided in advance of and behind the puncturing and riveting mechanism for the purpose of positively feeding the work.

All of the movable work-engaging members, whether feeding devices, puncturing devices or riveters, may conveniently take the form of disks which rest upon the top of the bed, of any desired thickness less than the depth of the flanges of the laths to be riveted together, and of a diameter somewhat less than the width of the strips so that each may lie in operative relation to one of the channels or ways and remain clear of the next adjacent channel or way. The heads illustrated are six different kinds; there being two plane disks, 4, lying on opposite sides of alternate channels near the front end thereof and two similar disks lying on opposite sides of the rear end of each of the same channels. At some distance behind the advance heads 4, which are simple feeding heads, are two disks, 5 and 6, arranged on opposite sides of each of the channels, the disk 5 having holes, 7, in its periphery and the disk 6 having projecting pointed pins or teeth, 8, each adapted to register with one of the holes in the disk 5 when the disks 5 and 6 are rotated in synchronism with each other. In rear of the disks 5 and 6 are two other disks, 9 and 10, lying on opposite sides of the channel, the disk 9 having cone shaped projections, 11, the points of which are adapted to enter openings, 12, in the edge of the disk 10 as the two disks are revolved in synchronism with each other.

The operation of the puncturing and riveting heads is best shown in Figs. 5 and 6. Referring to these figures, 14 and 15 represent two contacting flanges of two adjacent laths adapted to be riveted together. As the laths are fed along, the flanges 14 and 15 being guided by one of the channels, they first encounter the puncturing heads 5 and 6 which puncture holes at regular intervals through the flanges, displacing the metal laterally into the openings 7 as indicated at 16. As the flanges travel along the channel they encounter the riveting heads, 9 and 10, which are so timed that the cone shaped points 11 thereon enter the holes punched in the flanges by the puncturing teeth 8, but from the opposite side of the flanges, spreading the displaced metal, 16, and finally flattening or riveting it down against the sides of the flanges so as firmly to unite the flanges. This operation takes place along each of the channels or passages through which the flanges of the laths or strips to be fastened together are passing, so that two or more strips or laths may be securely fastened together into a sheet by simply feeding them across the work-receiving bed. The blank heads 4 are simple feeding devices, and instead of the riveting heads associated with the other channels or ways, the two outermost channels may have simple blank heads 4, as no riveting operation is required in these two channels. There is not sufficient room to place all of the puncturing heads in alinement with each other transversely of the machine, and the same is true with respect to the riveting heads; and therefore these heads are arranged in four lines, two lines of puncturing heads and two lines of riveting heads. Thus, with the front and rear feeding heads, there are in all six lines of heads which must be driven in unison with each other. These heads may conveniently be mounted on the upper ends of vertical shafts grouped in pairs as indicated at 17 and 18 and best illustrated in Fig. 7. These shafts extend upwardly through the interior of the hollow bed and through the top thereof. Between the first and second rows of vertical shafts is a transverse driving shaft, 19. Similar driving shafts, 20, 21 and 22, are arranged respectively between the second and third, between the fourth and fifth, and between the fifth and sixth rows of vertical shafts. The shaft, 17, of each pair is geared to the adjacent driving shaft by suitable gearing as, for example, spiral gears, 23. The shafts 17 and 18 of each pair are in turn geared together by suitable spur gears, 25. The shafts 19 and 20 are geared together by gears, 26 and 27, the shafts 21 and 22 are geared together by gears, 28 and 29, while the gears 26 and 28 mesh with a pinion, 30, on a counter-shaft, 31, which is driven by a suitable motor, 32, mounted on the base, 33, of the machine, or in any other suitable way. The parts are so proportioned that when the motor is started all of the heads will be driven in unison and at the same peripheral speed, the heads of each pair of course turning in opposite directions. It will be seen that all of the gears between the driving shafts and the vertical shafts are arranged within the interior of the hollow bed so that, by filling the interior of the bed with oil, all of the gears and all of the bearings will at all times be perfectly lubricated.

In order to insure that the feeding heads will grip the work firmly between them and that the riveting heads will flatten the metal displaced in the work by the puncturing heads, thus insuring a positive feed and uniform product regardless of variations in the thickness of the metal from which the laths are made, it is desirable that some means be provided for automatically adjusting these heads as conditions require. To this end I have mounted one shaft of each pair of these heads in such a way that it is adjustable automatically from and toward the other shaft so as to cause each pair of heads to adjust itself automatically. The shafts 17, being driven from the main driving shafts, are preferably allowed to run in fixed bearings while the shafts, 18, which are simply geared to the corresponding shafts 17 may therefore readily be made floating so as to be movable from and toward the shafts 17.

As best shown in Figs. 10 and 11, each of the shafts 18 which it is desired to make a floating shaft, lies in a sleeve, 34, arranged eccentrically in an opening in the bed 1 larger in diameter than the sleeve, such opening being indicated at 35. The sleeve is provided with laterally projecting ears 36, which, with a cylindrical block 37 of the same length as the sleeve, somewhat larger in diameter than the ears 36, and suitably recessed to receive these ears, forms a hinged knuckle the two members of which are held together by a pin, 38. At one side of the opening 35 is a smaller communicating opening, 39, in which the hinged knuckle lies. The openings 35 and 39 overlap so that the passageway between them is narrower than the diameter of the knuckle and consequently after the knuckle is slipped endwise into the opening 39 it holds the sleeve 34 against lateral movements except swinging movements about the fixed axis of the hinge pin 38. On the lower end of the sleeve is a laterally projecting arm, 40, against which works a spring which constantly exerts a tendency to swing the sleeve and therefore the shaft and the work engaging head carried by the shaft toward the coöperating shaft and work engaging head. The arm extends beneath the hinge pin 38 while the work engaging head overlaps this pin at the top. Consequently the hinge pin is locked in place when the work engaging head is secured upon the shaft. A simple method of mounting the springs in operative relation to the arms of the several sleeves is to arrange within the hollow bed adjacent to the ends of each row of arms, for example the arms controlling the floating heads of the advance feed devices as indicated in Figs. 8 and 9, a stationary rod, 41, extending from one side of the bed to the other; the arms being preferably forked at their outer ends as indicated at 42 so as to permit them to embrace the rod; and a series of springs, 43, being arranged on the rod, each between a fixed shoulder, 44, on the rod and one of the arms 40.

In order to permit the supporting shafts for the work engaging heads to be adjusted nicely in the vertical direction, each of these shafts may rest at its lower end upon a block of anti-friction metal, 45, as indicated in Fig. 10, this block being in turn supported upon an adjusting screw, 46. The blocks 45 take the wear while the screws 46 permit accurate adjustment in the vertical direction to be made.

In advance of the mechanism heretofore described I have arranged a long wide feed table, 50, whose top is in the plane of the top of the bed 1, whose width is equal to the width of the work-receiving portion of the bed and whose length is somewhat greater than the length of the longest laths that it is desired to pass through the machine. The laths to be riveted together are laid upon the table, side by side, with their flanges registering with the channels or ways, and they are then fed forward in unison with each other until they are engaged by the rotary heads. Upon the front end of the feed table, that is the end farthest from the work-receiving bed, is a transverse apron which is adapted to engage with the ends of laths on the table and push them forwardly. In the arrangement shown, the apron consists of two castings, 51, in the form of angle irons, each having one flange resting on top of the feed table and its other flange engaging with the outer edge or side of the table. The top or horizontal flanges are connected together by a metal plate, 52, extending across the same from one side of the table to the other. Each of the castings is provided with an upwardly projecting portion, 53, at the front end thereof and, lying against and secured to these projections is a narrow vertical plate or strip, 54, which may either be an independent piece or a part of the plate 52; the member 54 forming a ledge against which the ends of a number of laths lying upon the plate 52 will abut. Other ledges, 55 and 56, are arranged at opposite ends of the plate 52 at right angles to the plate and to the ledge 54; the ledges 55 and 56 being in alinement with the outermost channels or ways 3 on the work-receiving table so that laths pressed against these ledges will have their outermost flanges alined with these channels.

It will be seen that the depending flanges of the angle irons, 51, serve as guiding shoes which hold the apron accurately alined as it is slid back and forth along the table. The central portion of the feed table, for some distance inwardly from the advance end thereof, is cut away so as to provide a passage, 57, within which a workman, pushing or pulling the table back and forth, may walk. Since there may be a considerable load on the apron when it is pushed forward to feed a series of laths into the riveting mechanism, I have provided means for moving the apron forward by power, permitting it to be drawn back manually by the workman who will naturally follow the apron to see that the feed is progressing satisfactorily. To this end I have arranged at each side of the table a continuous flexible member, 60, preferably in the form of a sprocket chain passing at the inner end of the table over a sprocket wheel, 61, each of which is fixed to a transverse shaft, 62, which may conveniently be driven by means of a gear wheel, 63, meshing with the gear wheel 27. Near the outer end of the feed table are idle sprocket wheels, 64, over which the chains pass. On the feed apron are suitable catch devices which may be engaged at will with the sprocket chains so as to cause the chains to draw the apron forward; these catch devices being released, preferably automatically, when the feed table is moved far enough to have completed its work. In the arrangement shown, each sprocket wheel is provided with a number of clips, 65, arranged thereon a short distance apart, these clips projecting upwardly from those portions of the chain which are at the top. At the ends of the apron, that is on the depending flanges of the castings 51, are dogs, 66, which, through gravity or otherwise, tend normally to drop down, and be engaged by corresponding clips on the two chains so as to cause the apron to be drawn forward by the chains. The front end of each of the dogs is wedge shaped as indicated at 67, and, in the path of each of these wedge shaped ends, is a suitable stationary tripping device for engaging with the corresponding dog after the apron has been carried a predetermined distance and releasing the dog from the chain. In the arrangement shown, the tripping devices are simply projections fastened to the table in position to engage with the inclined end of the corresponding dog and cause this inclined end to ride up the same. The dogs are controlled as follows: Behind each dog is a locking bolt, 69, provided with a spring, 70, which normally forces the bolt toward the dog so as to hold the nose of the bolt in position to engage with one end of the dog and hold the dog in its inoperative position. Upon retracting the bolt, the dog is free to drop into operative relation to the chain. The locking or holding bolts are controlled by a transverse rock shaft, 71, mounted in the upward projections, 53, of the apron and extending from one end of the apron to the other. At an intermediate point on the rock shaft, within easy reach of a workman in position to walk back and forth in the open space, 57, in the table, is a handle, 72, by which the rock shaft may be turned. At its ends the rock shaft is provided with depending arms, 73, which are suitably connected to the ends of the bolts as, by means of a pin and jaw device, 74. Normally the springs tend to hold the locking bolts in their forward positions but, upon raising the handle 72, the bolts will be retracted so as to permit the dogs 51 to drop down into operative relation to the sprocket chains. The dogs will be engaged by two of the clips on the sprocket chains and the apron will be carried along until the dogs reach the tripping projections, 68, whereupon the dogs will be lifted and released from the chains and the locking bolts will shoot forward and will hold them in their raised inoperative positions.

When the apron is released from the chains, the workman, who has followed the apron, draws it back to the starting point, the laths passing through the riveting machine by reason of the feed given thereto by the work-engaging heads. When the laths which are being riveted are sufficiently out of the way, additional laths are laid side by side on the table with their rear ends lying upon the apron and engaging with the transverse ledge so as to be accurately alined. The apron is then again clutched to the chains and the feeding operation heretofore described is repeated.

Each of the work-engaging heads preferably has a portion cut away at the periphery in proximity to the top of the bed so as to provide a space, 75, to receive laterally projecting portions, 76, on the flanges of the laths; thus permitting the riveting together of laths having reinforced flanges as well as those having plane flanges.

It will thus be seen that I have produced a simple and reliable machine for securely riveting together any desired number of channels by a rapid continuous process which permits the riveting to be accomplished at an extremely low cost. It will also be seen that I have provided a simple feeding device for accurately alining the ends of any desired number of channels to be riveted together and feeding them accurately into the receiving machine which fastens them together into a single sheet.

While I have illustrated and described with particularity only a single preferred embodiment of my invention which has been found to operate very successfully in actual practice, I do not desire to be limited to the exact structural details thus illustrated and described; but intend to cover all forms and arrangements which come within the terms employed in the definitions of my invention constituting the appended claims.

I claim:

1. In a machine of the character described, a bed having a flat top, rows of punching and riveting heads arranged above the bed so as to be rotatable about axes at right angles to the plane of the top of the bed, and means for feeding strips to be riveted together along the bed between said heads.

2. In a machine of the character described, a bed having a horizontal top, vertical shafts projecting upwardly through the top of said bed, punching and riveting heads on said shafts above the bed, and means for feeding work between said heads.

3. In a machine of the character described, a bed having a flat top, and rows of punching and riveting heads arranged above the bed so as to be rotatable about axes at right angles to the plane of the top of the bed.

4. In a machine of the character described, a bed having a horizontal top, vertical shafts projecting upwardly through the top of said bed, and punching and riveting heads on said shafts above the bed.

5. In a machine of the character described, a work-receiving bed, guides on the bed forming a series of parallel channels or ways extending across the bed, and work-puncturing and work-riveting heads arranged along each channel and including means operating transversely of the guides and through said channels to rivet together members fed along said channels.

6. In a machine of the character described, a bed, guides on the top of the bed forming a series of parallel channels or ways extending across the bed, each channel being adapted to receive the engaging flanges of two flanged strips passing over the bed, and puncturing and riveting mechanism arranged above the bed and including elements working across said channels to rivet together the flanges lying in the channel.

7. In a machine of the character described, a hollow bed having a flat work-receiving top, a plurality of driving shafts extending transversely through the interior of the bed, a plurality of vertical shafts extending from the interior of the bed in proximity to the driving shafts through the top of the bed, gearing between each driving shaft and the corresponding vertical shaft, and work-engaging heads on said vertical shafts above the top of the bed.

8. In a machine of the character described, a bed having a flat work-receiving surface, pairs of rotary work-engaging heads arranged in rows in proximity to said surface, each head being revoluble about an axis extending at right angles to said surface, each row containing a pair of punching heads and a pair of riveting heads arranged behind the punching heads.

9. In a machine of the character described, a bed having a flat work-receiving surface, pairs of rotary work-engaging heads arranged in rows in proximity to said surface, each head being revoluble about an axis extending at right angles to said surface, each row containing a pair of punching heads and a pair of riveting heads arranged behind the punching heads together with simple feeding heads arranged in advance of and behind the punching and riveting heads.

10. In a machine of the character described, a bed having a flat top, guides on the top of the bed forming a series of parallel channels or ways extending across the bed, and work-puncturing and work-riveting heads arranged along each channel or way, said heads being grouped in pairs the members of which are disposed on opposite sides of the corresponding channel or way.

11. In a machine of the character described, a bed having a flat top, guides on the bed forming across the top thereof a series of parallel channels, a plurality of pairs of work-engaging heads arranged adjacent to each channel, the heads of each pair lying on opposite sides of the corresponding channel, one pair of heads adjacent each channel being constructed to puncture work passing through the channel while a following pair of heads is constructed and arranged to rivet the material struck up from the work by the puncturing operation.

12. In a machine of the character described, a series of rotary work-puncturing and -riveting mechanisms, a feed table in advance of said mechanisms, and a work-feeding device movable over said table toward said mechanisms at the speed at which the work passes through said mechanisms.

13. In a machine of the character described, a series of strip-puncturing and -riveting mechanisms adapted to rivet each strip of a series of strips to the adjacent strips, a feed table in advance of said mechanisms, and means for feeding into said mechanisms a series of strips lying side by side on said table.

14. In a machine of the character described, a series of strip-puncturing and -riveting mechanisms adapted to rivet to the adjacent strips each strip of a series arranged side by side, a feed table in advance of said mechanisms, and means on said table for engaging and feeding simultaneously into said mechanisms strips lying side by side on the table and equal or less in number than said series.

15. In a machine of the character described, a series of work-puncturing and -riveting mechanisms, a feed table in advance of said mechanisms, an apron on said table, and means for moving said apron across the table toward said mechanisms at the speed at which the work passes through said mechanisms.

16. In a machine of the character described, a series of work-puncturing and -riveting mechanisms, a feed table in advance of said mechanisms, an apron on said table, means for moving said apron across the table toward said mechanisms at the speed at which the work passes through said mechanisms, and means for automatically stopping the apron when a predetermined point is reached.

17. In a machine of the character described, a series of mechanisms for fastening a plurality of strips into a sheet, a table in advance of said mechanisms, and an apron on said table movable from and toward said mechanisms and adapted to engage the ends of strips on the table and push them into operative relation to said mechanisms.

18. In a machine of the character described, mechanism for operating upon strips, a feed table in advance of said mechanism, an apron slidable on the table from and toward said mechanism, a driving member movable toward said mechanism at the speed at which work passes through said mechanism, and means for clutching said apron to said driving member.

19. In a machine of the character described, mechanism for operating upon strips, a feed table adjacent to said mechanism, an apron on said table slidable from and toward said mechanism, an endless driving member extending lengthwise of the table, and a clutch device for connecting the apron to said member.

20. In a machine of the character described, mechanism for operating upon strips, a feed table adjacent to said mechanism, an apron on said table slidable from and toward said mechanism, endless driving members extending along opposite sides of the table, and means at the ends of said apron for clutching it to said driving members.

21. In a machine of the character described, mechanism for operating upon strips, a feed table adjacent to said mechanism, an apron on said table slidable from and toward said mechanism, endless driving members extending along opposite sides of the table, dogs on the ends of the apron, devices on the chains for engaging the dogs to drive the apron, and means for automatically releasing the dogs from said devices.

22. In a machine of the character described, mechanism for operating on strips, a feed table in advance of said mechanism, said table having the central portion removed for some distance inwardly from the front to afford walking space for a workman, and an apron extending transversely across the table and movable from and toward said mechanism.

23. In a machine of the character described, mechanism for operating on strips, a feed table in advance of said mechanism, said table having the central portion removed for some distance inwardly from the front to afford walking space for a workman, an apron extending transversely across the table and movable from and toward said mechanism, actuating means for said apron, and controlling means for said actuating means including a manually operated part in the vicinity of said walking space.

24. In a machine of the character described, a bed, a series of pairs of rotary work-engaging heads on said bed for riveting together the flanges of two adjacent channel laths on the bed and feeding the laths through the machine, and means for yieldingly pressing some of the heads toward the coöperating heads.

25. In a machine of the character described, a bed, a row of pairs of rotary work-engaging heads on the bed, a stationary rod extending along said row, and means between said rod and certain of the heads for pressing the latter yieldingly toward the coöperating heads.

26. In a machine of the character described, a flat table, means for feeding across the table a series of flanged strips with the flanges of each strip engaging with flanges on adjacent strips, and means for acting on said flanges while the strips are on the table for riveting the flanges on each strip to the corresponding flanges on adjacent strips.

In testimony whereof, I sign this specification.

FRED C. AREY.

Copies of this patent may be obtained for five cents each, by addressing the "Commissioner of Patents, Washington, D. C."